US008355665B2

(12) United States Patent
Maron et al.

(10) Patent No.: US 8,355,665 B2
(45) Date of Patent: Jan. 15, 2013

(54) PROCESS FOR COMPUTERIZED GRADING OF FORMULA-BASED MULTI-STEP PROBLEMS VIA A WEB-INTERFACE

(76) Inventors: Mel Maron, Louisville, KY (US); Troy E. Howe, Greenwood, IN (US)

( * ) Notice: Subject to any disclaimer, the term of this patent is extended or adjusted under 35 U.S.C. 154(b) by 2354 days.

(21) Appl. No.: 10/397,303

(22) Filed: Mar. 27, 2003

(65) Prior Publication Data

US 2004/0191746 A1    Sep. 30, 2004

(51) Int. Cl.
*G09B 11/00* (2006.01)
(52) U.S. Cl. ..................................... 434/353
(58) Field of Classification Search ............... 434/188, 434/362, 353, 365
See application file for complete search history.

(56) References Cited

U.S. PATENT DOCUMENTS

| | | | | |
|---|---|---|---|---|
| 5,211,564 A | * | 5/1993 | Martinez et al. | 434/362 |
| 5,827,066 A | * | 10/1998 | Henter | 434/188 |
| 2004/0018479 A1 | * | 1/2004 | Pritchard et al. | 434/350 |
| 2004/0126745 A1 | * | 7/2004 | Bell et al. | 434/201 |
| 2004/0157203 A1 | * | 8/2004 | Dunk et al. | 434/350 |

* cited by examiner

*Primary Examiner* — Kathleen Mosser
(74) *Attorney, Agent, or Firm* — H. Jay Spiegel

(57) ABSTRACT

The method of computerized grading of formula-based multi-step problems includes the steps of providing a memory for storing problems and data to enable and facilitate assessment of correctness of problems, storing at least one formula-based multi-step problem in the memory, a complete solution to the problem requiring calculation of at least one intermediate answer and a subsequent calculation using said intermediate answer to arrive at said complete solution, providing a computer program that can grade submitted answers to the steps of said problem, providing a user interface with selective access to the memory and the computer program, and providing a global computer network with which the user interface can be connected to the memory and grading program.

1 Claim, 4 Drawing Sheets

System For Grading Multi-Part Formula-Based Problems

Figure 1 System For Grading Multi-Part Formula-Based Problems

Diagram Illustrating Example 2 for $xc = 1$ and $f(x) = x^3 + \frac{1}{2} x^2$, i.e., $f(x) = a\, g(x) + b\, h(x)$ with $a = 1$, $b = 1/2$, $g(x) = x^n$, $n = 3$, and $h(x) = x^m$, $m = 2$.

FIGURE 3 Answer-Entry Window for a Second Submission of Example 1

Math 123  Homework 3  Problem 1

For the line segment from A(2, 1) to B(-1, 3) in the xy-plane: It has x-increment $Dx = \_A1$, slope $m = \_A2$, length = $\_A3$, and y-intercept $b = \_A4$. The y-coordinate of its midpoint $M(xM, yM)$ is $yM = \_A5$, and an equation for the circle having AB as a diameter is $\_A6$. Enter exact numbers, not decimals, e.g., 1/3, not 0.33; √2, not 1.414; etc.

C = already Correct
R = Required (final answer)        (Re-)Enter Answers        Grade Entered Answers        Finished With Problem
O = Optional (intermediate)

| CRO | Answer-Entry Column | Answer Information Column |
|---|---|---|
| O | _A1    -2 | Unsuccessful tries = 1 |
| C | _A2  (shaded) | Correct on try 1 |
| O | _A3 | |
| R | _A4    7/3 | |
| O | _A5    4 | |
| R | _A6    $\left(x - \frac{1}{2}\right)^2 + (y-4)^2 = 2$ | |

FIGURE 4 Reported Results of Second Submission of Example 1

Math 123 Homework 3 Problem 1

For the line segment from A(2, 1) to B(-1, 3) in the $xy$-plane: It has $x$-increment $Dx = $ _A1, slope $m = $ _A2, length = _A3, and $y$-intercept $b = $ _A4. The $y$-coordinate of its midpoint $M(xM, yM)$ is $yM = $ _A5, and an equation for the circle having AB as a diameter is _A6. Enter exact numbers, not decimals, e.g., 1/3, not 0.33; √2, not 1.414; etc.

C = already Correct
R = Required (final answer)    ☐ (Re-)Enter Answers    ▨ Grade Entered Answers    ☐ Finished With Problem
O = Optional (intermediate)

| CRO | Answer-Entry Column | Answer Information Column |
|---|---|---|
| R | _A1  -2 | Graded Not Correct on try 2 |
| C | _A2 | Correct on try 1 |
| C | _A3 | Graded Correct on try 1 |
| C | _A4  7/3 | Graded Correct on try 1 |
| R | _A5  4 | Graded Not Correct on try 1 |
| C | _A6  $\left(x-\tfrac{1}{2}\right)^2 + (0-4)^2 = 2$ | Graded Correct on try 1 |

PROCESS FOR COMPUTERIZED GRADING OF FORMULA-BASED MULTI-STEP PROBLEMS VIA A WEB-INTERFACE

BACKGROUND OF THE INVENTION

The present invention relates to a process for computerized grading of formula-based multi-step problems via a web-interface. At present, it is generally known to grade math, science, engineering and/or technology problems via the use of a global computer network through access to websites. Such services are currently being rendered by distance education providers such as Blackboard, Brownstone, WebCT, ecollege and ANGEL. Major textbook publishers have created websites for the same purpose. Applicant is aware of publishers John Wiley and Sons, Brooks/Cole, Addison Wesley, and Prentice Hall establishing websites for this purpose. Additionally, academic institutions have been offering computerized grading of problems, both alone and in partnership with distance education providers or computer algebra system (CAS) vendors. Applicant is aware that two major such vendors, Maple and Mathematica, have developed working relationships with distance education providers, academic institutions, and publishers.

Systems developed by Maple and Mathematica can manipulate mathematical formulas and can recognize any numerical or symbolic expression that is likely to be an answer to any problem in any course one may encounter at the pre-college, undergraduate, or graduate level. As a result, the most intense current activity in computer-grading of math-type problems involves grading answers that are symbolic rather than multiple choice type answers, fill-in-a-blank type answers or purely numeric answers. The significant features employed by known symbolic answer graders are the following:

(1) A variety of methods for free-form entry of symbolic-expression answers;

(2) Gradable problems have parameters that can be used to change numerical values in the problem statement. Assignment of parameters can be random;

(3) The use of computer algebra systems to grade problems by comparing a submitted answer to a pre-programmed correct answer, with checks to ensure that an answer is of the correct type, for example, algebraic category, and that students submit an answer rather than computer-algebra-system instructions to achieve the answer;

(4) Intelligent hints to permit algorithmic, interactive self-grading of an answer;

(5) Sub-questions employed as hints to the student if the student wishes to use them;

(6) The ability to resubmit incorrect answers repeatedly until a correct answer is achieved with provision for penalties for multiple tries to correctly answer a problem;

(7) Use of predefined answer types such as, for example, algebraic, matrix, constant, multiple choice, or string;

(8) Systems are known that permit both students and instructors to obtain detailed progress reports.

Distance education providers emphasize customization of problems to meet the desires and needs of an individual instructor.

The problems that typically appear in course textbooks for algebra, calculus, and other mathematical and technical subjects are formula-based multi-step problems for which answers to earlier steps are used to obtain subsequent intermediate and final answers. Moreover, a particular intermediate answer may be obtainable from prior answers in several different ways, each of which may involve an equally valid methodology. Many, if not most, problems assigned for homework or given on a quiz or exam in such courses are typically adapted from a textbook and hence are of this multi-step form.

As should be understood from the above explanation, current web-based systems grade only one answer at a time. Related answers are requested diagnostically, for example, as a hint or sub-problem, only after a single answer is recognized as incorrect. As such, in such systems, the student must submit all correct answers, one at a time, to obtain full credit.

By contrast, effective hand-grading of formula-based multi-step problems uses two shortcut-type strategies, referred to herein as the Prior-Answer Strategy and the Later-Answer Strategy:

(1) The Prior-Answer Strategy looks for correct intermediate or final answers, which when found give full credit for all relevant prior answers used to get it.

If an incorrect intermediate answer is found, an experienced hand-grader will use the second strategy;

(2) The second strategy is the Later-Answer Strategy in which subsequent steps are examined and subjective credit is given for answers that are incorrect, but which appear to have been obtained correctly based upon incorrect but reasonable answers to earlier steps.

When hand-graders apply these two strategies combined with the innate human ability to recognize and accept more than one correct formula for using prior answers to obtain later answers, the student obtains the maximum credit deserved for problem steps that were correctly performed. The prior art fails to teach or suggest any computerized system that incorporates these grading strategies used by effective hand-graders to fairly and fully grade problems. It is with this thought in mind, among others, that the present invention was developed.

SUMMARY OF THE INVENTION

The present invention relates to a process for computerized grading of formula-based multi-step problems via a web interface. In accordance with the teachings of the present invention, multi-answer problems can be computer graded in a manner analogous to effective hand-grading by a skilled teacher, but in a more consistent fashion and more fairly and impartially than can a human being.

The present invention includes the following interrelated objects, aspects and features:

(1) The inventive system grades multi-answer problems that look and feel like typical homework and test problems that instructors currently assign students and then grade by hand.

(2) Students can opt to submit some or all of a problem's answers simultaneously. This is a distinct improvement over the prior art in which answers must be submitted sequentially.

(3) For each answer, the inventive system can recognize the correct use of several different formulas possibly involving different prior answers and possibly even getting different numeric or symbolic values that can, under certain circumstances, be graded as correct answers.

(4) In accordance with the teachings of the present invention, parameters used in problems and their solutions can be symbolic as well as numeric, thereby greatly enhancing the versatility of a given problem.

(5) The present invention can employ the Prior-Answer Strategy or the Later-Answer Strategy or both. In the Prior-Answer Strategy, one looks for correct intermediate or final answers, which when found permit giving of full credit for all unsubmitted prior answers used to get it. On the other hand, if a submitted answer is incorrect, the Later-Answer Strategy examines subsequent steps and gives credit for answers that are incorrect but obtained correctly from incorrect but reasonable answers to earlier steps. In other words, if in an earlier step, the student obtains a wrong answer, then that wrong answer will be carried through to render subsequent answers wrong as well. However, if the incorrect answer is reasonable (i.e., isn't inappropriate or overly simple) and the student applies a proper process for answering subsequent parts based upon the incorrect intermediate answer, the inventive system permits giving at least partial credit for the subsequent answers that are technically incorrect but properly follow a correct required process.

(6) The inventive system includes an answer entry window that informs the student of the minimal set of submitted answers required for full credit. The answer entry window operates by displaying each step's answer entry area as "C" (already correct, hence disabled), "R" (required for full credit), or "O" (optional, but gradable). Of course, the letters C, R and O are merely exemplary and any desired letters or other visual identifiers can alternatively be employed. A non-C answer is displayed as O if it is used in one or more R-answer formulas. By the Prior-Answer Strategy, an unsubmitted O-answer will be graded as correct if an R-answer obtained using a formula in which it appears is graded as correct.

(7) The author of the problem must submit a single, easily prepared computer-algebra-system procedure, herein designated as answers( ) although any meaningful name can be used, containing only the acceptable formulas for each answer. This single procedure is used both to prepare the C-R-O display as explained in paragraph (6) above, and to implement the Prior-Answer and Later-Answer Strategies.

(8) All data base information needed to grade problems is stored in the form of computer-algebra-system instructions. In this way, problems are easy to prepare for inclusion in assessment instruments conducted in accordance with the teachings of the present invention.

(9) In practicing the present invention, problems are uploaded to a problem table of the inventive system's data base via an authoring tool, to be described in greater detail hereinafter, which first tests the author provided computer-algebra-system information for correctness and accuracy. This ensures reliability of problems stored on the data base.

(10) In this system, all problems are viewed as owned by a party that may or may not be the problem author. The present invention is configurable so that in return for negotiated incentives, Copyright owners will allow their problems to be freely available for use on a single searchable data base, with each customer, whether university, sub-department or other institution, having selective access to a desired class of problems.

Accordingly, it is a first object of the present invention to provide a process for computerized grading of formula-based multi-step problems via a web interface.

It is a further object of the present invention to provide such a process and system in which the Prior-Answer Strategy and Later-Answer Strategy typically used by experienced hand-graders are programmed therein.

It is a still further object of the present invention to provide such a process and system which permits grading of multi-answer problems having the look and feel of typical homework and test problems that instructors currently assign and grade by hand.

It is a still further object of the present invention to provide such a process and system that permits recognizing the correct use of several different formulas, even possibly involving different prior answers and getting different resulting answers.

It is a yet further object of the present invention to provide such a process and system in which parameters can be symbolic as well as numeric.

It is a still further object of the present invention to provide such a process and system including incorporation of an answer entry window that tells the student the minimum set of submitted answers that are required for full credit.

These and other objects, aspects and features of the present invention will be better understood from the following detailed description of the preferred embodiments when read in conjunction with the appended drawing figures.

BRIEF DESCRIPTION OF THE DRAWINGS

FIG. 3 shows a schematic representation of an answer entry window for a portion of the problem solving process for the problem of Example 1.

FIG. 4 shows a schematic representation of an answer entry window for a further portion of the problem solving process for the problem of Example 1.

SPECIFIC DESCRIPTION OF THE PREFERRED EMBODIMENTS

The inventive process grades multi-answer problems for which correct answers can be symbolic and may be obtainable by several formulas or methods. Its key innovative features are the following, which simulate effective hand grading of such problems. It can inform the student, based on what was previously graded as correct, of which answers are required, hence must be submitted for full credit;

It allows: the student to (re-)submit simultaneously, a selected set of some or all required and/or optional answers that were not yet graded as correct;

It can recognize several formulas or methods, which can involve both symbolic and numeric parameters and may give different values, as correct processes for getting a particular answer;

It can use the Prior-Answer Strategy and Later-Answer Strategy, as explained in detail below, to give maximum deserved partial credit for a given set of submitted answers.

These features can be implemented in a variety of ways. The examples described herein seek to emphasize understandability rather than efficiency or flexibility of implementation so as to explain that which Applicant regards as the invention. To this purpose, the example problems are math problems with parameters and answers that are either integers, fractions, or algebraic expressions or equations. However, the inventive process can, just as effectively, be used to grade typical problems for any quantitative course, and for which problem parameters and answers can involve decimals and/or any symbolic objects that can be recognized by a CAS, e.g., trigonometric or boolean (true/false) expressions, vectors, matrices, graphs, differential equations, etc.

The author of a multi-answer problem must provide the text of the problem statement, formulas that can be used to get correct answers, and restrictions on the problem's parameters. Two examples are used below to illustrate this information.

Figure 2:
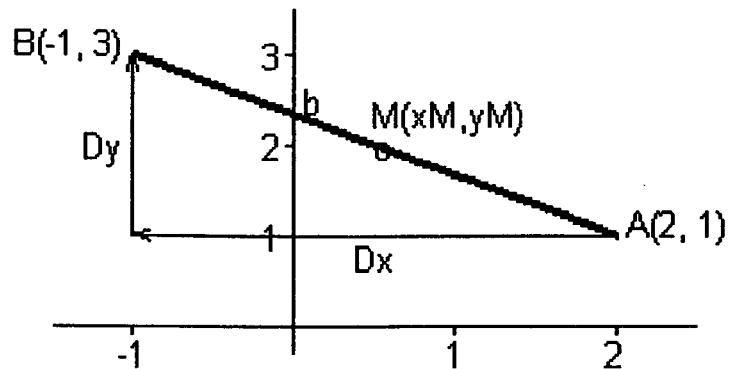
FIG. 2 shows a graph depicting the problem of Example 1.

FIG. 2 shows a graph of problem Example 1, an analytic geometry problem with six answers (denoted in boldface as _A1, _A2, . . . , _A6 in the problem text) and four integer parameters, xA, xB, yA, and yB. The delimiters |* *| in the problem text enclose a CAS expression that is to be displayed in math notation (viz., as √2) in the Answer-Entry Window. Other delimiters can be used.

EXAMPLE 1

4-Parameter Analytic Geometry Problem

Problem Text
For the line segment from A(xA, yA) to B (xB, yB) in the xy-plane: It has x-increment Dx=_A1, slope m=_A2, length=_A3, and y-intercept b=_A4. They coordinate of its midpoint M(xM, yM) is yM=_A5, and an equation for the circle having AB as a diameter is _A6. Enter exact numbers, not decimals, e.g., ⅓, not 0.33; |* sqrt(2) *|, not 1.414; etc.
Formulas for Answers [_Ai Denotes a Prior Answer Used to get _Aj]
For _A1: xB−xA. #=Dx; similarly Dy=yB−yA
For _A2: (yB−yA)/(xB−xA) or (yB−yA)/_A1. # i.e., Dy/Dx or Dy/_A1
For _A3: $\sqrt{(Dx^2+Dy^2)}$ or $\sqrt{(\_A1^2+Dy^2)}$.
For _A4: yA−(Dy/Dx)xA, yA−_A2 xA, or yB−_A2 xB. # 3 formulas
For _A5: ½(yB+yA). #=yM; similarly xM=½(xB+xA)
For _A6: $(x-xM)^2+(y-yM)^2=¼(Dx^2+Dy^2)$, $(x-xM)^2+(y-\_A5)^2=¼\_A3^2$,
$(x-xM)^2+(y-yM)^2=¼\_A3^2$, or $(x-xM)^2+(y-\_A5)^2=¼(Dx^2+Dy^2)$.
Parameter Restrictions xA, yA, xB, yB are integers, with further restrictions:
  xA between 1 and 6; xB between −1 and −6 (xB not equal −A);
  yA between 1 and 8; yB between 1 and 8 (yB not equal yA).
The first formula given for each of _A1, _A2, . . . , _A6 uses only the problem's parameters; all others involve prior answers, denoted in italics as _A1, _A2, . . . , _A5.

Parameter restrictions are needed to ensure answers that are "typical" and non-trivial (e.g., not 0 or 1), and to avoid unacceptable operations like division by zero when using the formulas. In Example 1, the restrictions on xA and xB ensure that any correct answer to _A1 (i.e., Dx) is strictly negative, hence that division by zero cannot occur in calculating _A2. Similarly, the yA and yB restrictions ensure that Dy and the correct answers to _A2 and _A5 are not zero. The parameter restrictions also avoid trivial addition or subtraction (of zero) in getting _A3, _A4 and _A6.

The diagram in FIG. 2 illustrates Example 1 with xA=2, yA=1, xB=−1, and yB=3. With these values, which satisfy the parameter restrictions, Dx=xB−xA is −3 (not 3) and Dy=yB−yA is 2. So the correct answers for these parameters are:
  _A1 is −3; _A2 is −⅔;
  _A3 is $\sqrt{13}$ (the square root of 13); _A4 is ⅓;
  _A5 is 2; _A6 is the equation $(x-½)^2+(y-2)^2=13/4$.
Typical intermediate calculations used to get these values are
  $Dx^2+Dy^2=(-3)^2+(2)^2=9+4=13$ and yB+yA=3+1=4.

In FIG. 2, all formulas for a given answer produce the same correct value when correct answers are substituted for _A1, _A2, . . . , _A5. However, the inventive system can grade problems for which different formulas for an answer give different correct values.

The Prior- and Later-Answer Strategies are implemented as follows: Suppose one or more formulas for _Aj depend on a prior answer _Ai (i.e., where i is less than j).

Later-Answer Strategy: Do the following for each _Ai that appears in a formula for _Aj: If an answer for _Ai was submitted and found to be either correct or "acceptably" incorrect, then substitute it for _Ai in all _Aj formulas. Otherwise, try substituting all possible _Ai-formula values (include the intended correct ones that just depend on the parameters) for _Ai. Find all _Aj-formula values that result from all possible combinations of all such substitutions for prior _Ais, and grade the submitted _Aj answer as correct if it agrees with any value thus obtained.

Prior-Answer Strategy: If a submitted _Aj answer is graded as correct, then do the following for each _Aj formula with which the submitted _Aj answer agrees: Grade all unsubmitted prior _Ais in the formula as correct, but leave those that were submitted along with _Aj as previously graded.

To illustrate, consider a student using the above parameters for Example 1. Suppose the student submits the incorrect answer −1 (rather than −3) for _A1, and −2 for _A2, and that −1 is an "acceptably incorrect" answer to _A1. Since −2 is the value obtained by substituting _A1=−1 correctly in the second _A2 formula, the Later-Answer Strategy dictates that _A2=−2 should be graded as correct; but _A1=−1 should remain as not-yet-correct. When the student next wishes to submit answers, the Answer-Entry Window will look like FIG. 3, where the problem statement appears in the usual mathematical notation (say using the MathML enhancement of HTML) and with parameters replaced by the actual values used. Thus, "A(xA, yA) to B(xB, yB)" in the problem text of FIG. 2 appears as "A(2, 1) to B(−1, 3)" in FIG. 3.

The Answer-Information Column of FIG. 3 indicates that the student previously entered answers for _A1 and _A2, but only _A2 was graded as correct. The shaded _A2 box indicates that it is disabled, to prohibit any attempt to re-submit an answer for _A2. In the CRO column, _A2 is shown as C (for correct), _A4 and _A6 are shown as R (for required) because no not-yet-correct answer has a formula in which _A4 or _A6 appears, and _A1, _A3 and _A5 are shown as O (for optional) because a correct _A3 can be obtained using _A1, and a correct _A6 can be obtained using _A3 and _A5.

Suppose that the student entered only the four answers shown in the Answer-Entry Column of FIG. 3, namely the correct answer to _A4, incorrect (but "acceptable") answers to _A1 and _A5, and an answer to _A6 that is incorrect, but was obtained by correctly substituting the value of the second _A3 formula for _A3 and the submitted _A5 answer for _A5 in the second formula for _A6. (It is assumed that some method is available for entering symbolic answers such as the equation for _A6, or at least verifying that an entered symbolic answer is syntactically correct.) When the student clicks on the Grade Entered Answers button, the grading module of the inventive system first determines that the submitted _A1 answer is incorrect but "acceptable." It then finds that the submitted _A4 answer agrees with the value obtained by all three _A4 formulas when all possible correct _A2 values (here, only −⅔) are substituted for _A2 in the last two. Had _A2 not already been graded as correct, it would have been so graded by the Prior Answer Strategy.

The grading module then finds that the submitted _A5 answer fails to agree with any calculated _A5 value (here, only 2); so it leaves _A5 as not-yet-correct. Finally, after determining that the submitted _A5 answer, 4, is "acceptably incorrect," it substitutes 4 for _A5 and all possible _A3 values for _A3 (namely, the intended correct value $\sqrt{13}$ from the first _A3 formula, and $\sqrt{[(-2)^2+(2)^2]}=\sqrt{8}$ from the second) in all four _A6 formulas, and finds that the submitted _A6 equation agrees with that of the second formula (with _A3=$\sqrt{8}$) but no others. So the Later-Answer Strategy dictates that _A6 should be graded as correct. And since the _A6 formula value that agreed with the submitted _A6 answer used _A3, the Prior-Answer Strategy dictates that the unsubmitted _A3 should be graded as correct. It then sees that the agreeing _A3 value depends on _A1, but dictates that the submitted _A1 be left as previously graded, in this case as incorrect.

FIG. 4 shows the updated Answer-Entry Window after the student clicked on the Grade Entered Answers button to have the four submitted answers in FIG. 3 graded as above, i.e., with maximum credit given for correctly-obtained intermediate answers, even if actually incorrect. The number of tries were appropriately incremented, all but _A1 and _A5 are displayed as correct, and _A1 and _A5 are displayed as required because all answers with formulas that depend on _A1 and _A5 have been graded as correct.

After reviewing the returned results, the student will click on either the (Re-)Enter Answers button (which will clear the previously entered answers and modify the Answer-Information Column to be as in FIG. 3) to re-submit answers for _A1 and/or _A5, or the Finished With Problem button to return to a previous web page and get options regarding what to do next. Although not shown, hints and other guidance and messages for each answer can be shown in the table's Answer-Information Column.

The student described above might subtract in the wrong order to get Dx=+3 and Dy=−2 (both with the wrong sign), but still got the correct _A2 answer, −⅔. If this student initially submits the correct answer for _A2 but doesn't submit the incorrect Dx for _A1, then the Prior-Answer Strategy as described above would grade _A1 as correct. The Prior-Answer Strategy can be adapted so that it is enabled or suppressed for each answer rather than for the whole problem. Similar adaptations of Later-Answer Strategy are possible, and subsumed in the teachings of this invention.

A second example involving symbolic parameters and answers will now be used to illustrate the ease with which the inventive system can create problems with flexibility and educational capabilities that far exceed existing grading art. The problem text, correct-answer formulas, and parameter restrictions for Example 2 are set forth below. Example 2 is a 4-answer calculus problem with 8 parameters, of which three (f, g, and h) are non-numeric, i.e., symbolic. Only two parameters actually appear explicitly in the problem text and formulas, namely f (the function to be differentiated), and xc (the x-coordinate of the tangency point). The remaining six, namely g, h, m, n, a, and b, are used to create f(x) as a sum, reciprocal, product, quotient, or composite of the; most-used elementary functions of a standard two-semester calculus course.

EXAMPLE 2

8 Parameter Calculus Problem

Problem Text
The derivative of y=f(x)=|* f(x) *| is f'(x)=|* 'diff(f(x),x)' *|=_A1. At x=xc, f(xc)=_A2, f'(xc)=_A3, and the equation of the tangent line is y=_A4.
Enter _A2 and _A3 exactly, i.e., use sin 1, not 0.84 . . . ; |*sqrt(3) *|/2, not cos |* Pi *|/6 or 0.866 . . . ; etc.
Formulas for Answers [_Ai Denotes a Prior Answer Used to get _Aj]
For _A1: df(x)/dx. # i.e., dy/dx=f'(x) [derivative of f(x)]
For _A2: value of f(x) at x=xc. # i.e., f(xc)
For _A3: value of df(x)/dx at x=xc or
    value of _A1 at x=xc. # i.e., f'(xc)
For _A4: f(xc)+f'(xc) (x−xc) or _A2+f'(xc) (x−xc) or
    f(xc)+_A3 (x−xc) or _A2+_A3 (x−xc).
Note 1: The formulas for _A1, _A2, and _A3 require single CAS commands. (See the CAS code for answers( ) below). Parameter Restrictions xc is a non-decimal constant, and f(x) is a function of x subject to:
    f(x) can be ag(x)+bh(x), 1/(ag(x)+bh(x)),
        ag(x)h(x), ag(x)/h(x), or a g(h(x));
    g(x) can be $x^n$, sin(nx), cos(nx), $e^{nx}$, ln(n+x);
    h(x) can be $x^m$, sin(mx), cos(mx), $e^{mx}$, ln(m+x);
    m and n are exact integers or fractions;
        a and b are exact integers or fractions such that
    f(xc) and f'(xc) are defined but not 0 or 1.
Note 2: With these values, the Problem Text will appear in the Answer-Entry Window as:
The derivative of y=f(x)=$x^3$+½$x^2$ is f'(x)=f(x)=_A1. At x=1, f(1)=_A2, f'(1)=_A3, and the equation of the tangent line is y=A4. Enter _A2 and _A3 exactly, i.e., use sin 1, not 0.84 . . . ; ½√3, not cos ∂/6 or 0.

In Note 2, |* f(x) *| got displayed with parameter values substituted; however, |* 'diff(f(x),x)' *| did not because the CAS Maple doesn't substitute values in expressions enclosed in single quotes. Other CASs have comparable capabilities. The conversion from author-provided problem text to HTML displayed in the Answer-Entry Window is described in section 3.E.

The parameter restrictions of Example 2 look rather complicated, but can be handled easily by a general CAS test procedure that accepts sets of parameter values and restrictions as input and returns true or false depending upon whether or not the set of parameter values meet the set of restrictive conditions.

When creating a course activity that involves random selection of parameters, e.g., a tutorial or ID-individualized homework, the Instructor Client allows the instructor to strengthen the parameter restrictions imposed by the problem author. For Example 2, the instructor might wish to allow only g(x)=$x^n$ and h(x)=$x^m$ or only g(x)=sin(nx) and h(x)=cos(mx), where and n can be only integers or only fractions. This enables the instructor of an introductory calculus course to (re-)use a single problem like Example 2 to grade just about any basic derivative a student might be asked to find on a test, tutorial, or homework assignment. Similarly, a single, versatile problem can be (re-)used for definite or indefinite integration in calculus, or more generally for any topic in any formula-based math, science, or engineering course.

In Example 2, the problem author provided four formulas for _A4, to allow for all four possible combinations of correct or incorrect answers to _A2 and _A3. This was also done for _A6 in FIG. 2. In fact, the inventive system will check all such possible combinations as part of the Later-Answer Strategy, sparing the problem author the need to do so. Thus, only the first and fourth _A4 formulas were actually needed in Example 2, and only the first and second _A6 formulas were actually needed in FIG. 2.

Figure 5:
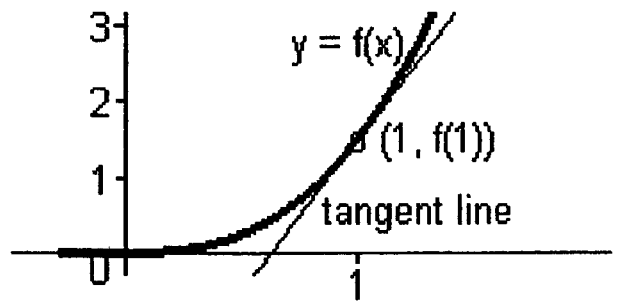
FIG. 5 shows a graph depicting the problem of Example 2.

The parameter values used for the illustrative diagram of FIG. 5 satisfy the parameter restrictions. With these values, the correct answers to Example 2 are
    _A1 is 3$x^2$+2x, _A2 is *frax*;3;2, _A3 is 5, _A4 is ½+2(x−2), with _A2 obtained as $(1)^3$+$(1)^2$/2, and _A3 obtained as 3$(1)^2$+2(1). The student may submit the _A1 answer as 2x+3$x^2$ or in factored form as x(3x +2), x(2+3x), (2+3x)x, etc., or the _A4 answer in expanded form as −½+2x or 2x−½. When an answer is a symbolic expression such as _A1 or _A4, the problem's author must specify whether "agreeing with" an acceptable correct value means any permissible algebraic rearrangement, as one would want in for _A1 and _A4, or in a particular form such as factored or expanded, as one might want for an introductory algebra problem. The inventive system must be implemented with pre-defined comparisons that enable various criteria for "agreement" of two decimal values (so many decimal places or significant digits), two equations (acceptable rearrangements, as for _A6 of Example 1), etc., as well as for two algebraic expressions. Provision for such varied "agreement" comparisons is easily implemented using a computer algebra system (see the discussion below of Comparison_Choices and of Selected_Comparisons).

Figure 1:
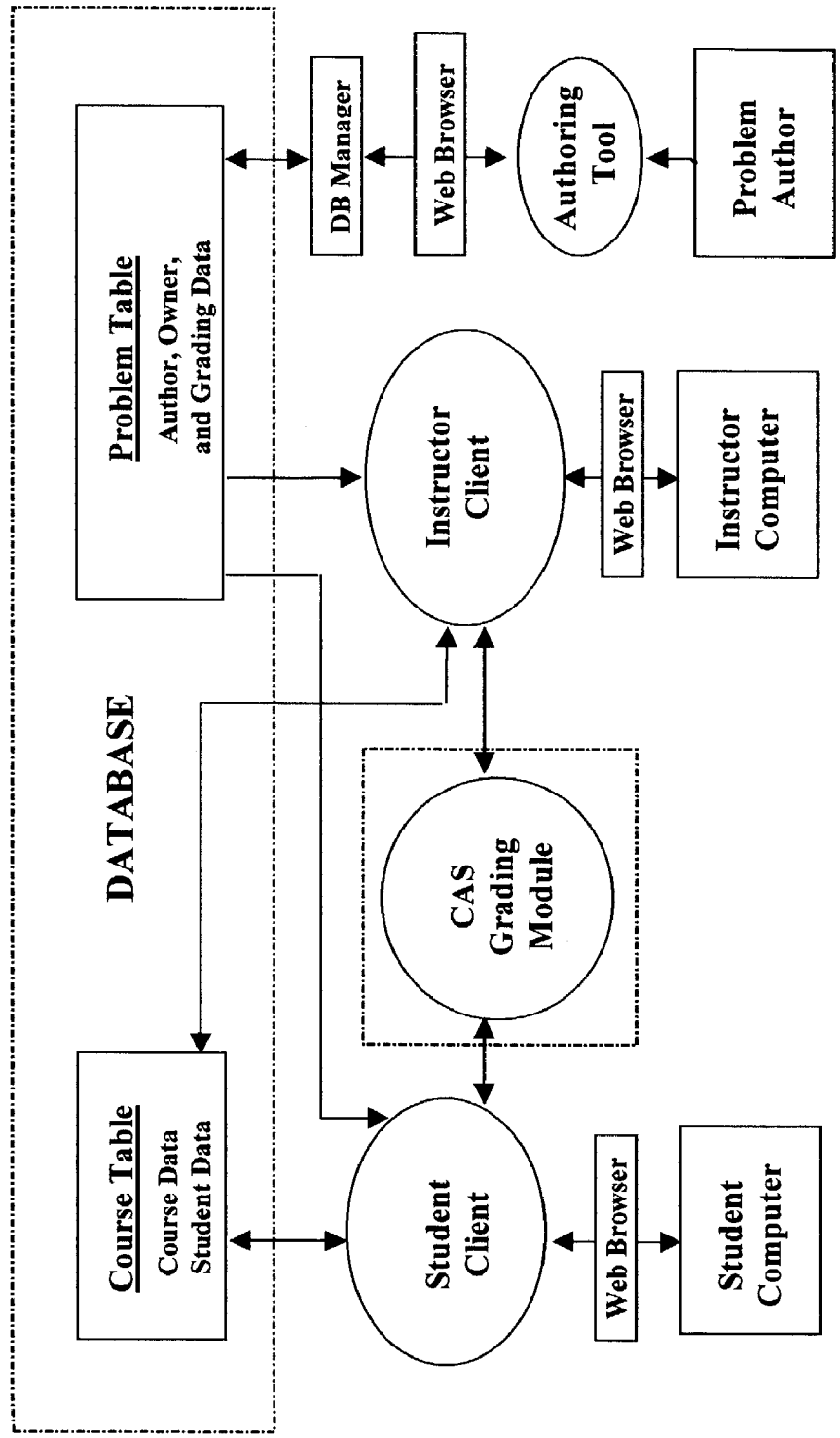
FIG. 1 shows a schematic representation of the inventive system.

This section describes how information flows when the effective grading described in the preceding sections takes place. Reference is made to FIG. 1. For the Problem Table of the database, data for a given problem is provided by the problem's author via an Authoring Tool and the Database Manager. For the Course Table, course activity data describing tests, tutorials, and homework assignments is provided by the course's instructor via the Instructor Client; and student performance data recording the grading results is stored by the Student Client.

The author of a multi-answer problem must provide administrative data (intellectual property ownership, contact information, etc.) along with the following grading data:

Parameter_Names A list of the names of the problem's parameters;

Problem_Text A CAS character string used to print the problem statement or to view it via the Student or Instructor Client;

answers( ) A CAS procedure that describes all acceptable formulas and methods that can be used to get correct answers;

Parameter_Restrictions A set of conditions that limit the ranges of parameter values.

Acceptability_Tests A list of tests to ensure that an incorrect submitted answer yields "acceptable" values when used correctly to get later answers (for the Later-Answer Strategy).

Comparison_Choices A list of acceptable ways to compare a submitted answer with a "correct" value.

To illustrate this information, refer to Examples 1 and 2 (FIGS. 2 and 5 and the problem specifications).

For Example 1, Parameter_Names stores the four-entry list [xA, xB, yA, yB]. For Example 2, it stores the eight-entry list [f, xc, g, h, m, n, a, b]. These lists become

[2, 1, −1, 3] and [x→x³+½ x², x→x'', x →x''', 3, 2, 1, ½], respectively, when the parameter values used to get FIGS. 2 and 3 are substituted.

Possible Maple procedures answers( ) for Examples 1 and 2 are:

answers:=proc(xA, yA, xB, yB) # for Example 1
local Dx,Dy, m, xM,yM, d2AB,d2PM,d2PA5; # d2=dist squared
   Dx,Dy,m:=xB−xA, yB−yA, Dy/Dx;
   xM,yM:=(xB+xB)/2, (yB+yA)/2; # midpt
   d2AB,d2PM:=Dx^2+Dy^2, (x−xM)^2+(y−yM)^2; # P=(x, y)
   formulas(1, [Dx]); # x_change
   formulas(2, [m, Dy/_A1]); # slope
   formulas(3, [sqrt(dAB2), sqrt(_A1^2+Dy^2)]); # dist(AB)
   formulas(4, [yA−m*xA, yA−_A1*xA, yB−_A1*xB]); # y-cept
   formulas(5, [yM]); # y-mid
   d2PA5:=(x−xM)^2+(y−_A5)^2; # P on circle
   formulas(6, [d2PM=d2AB/4, d2PA5=d2AB/4, d2PM=_A3^2/4, d2PA5=A3^2/4]); # circle' seq
end:
answers:=proc(f, xc) # for Example 2
local fc,Dfc;
   fc,Dfc:=f(xc), D(f)(xc);
   formulas(1, [D(f)(x)]); # f'(x)
   formulas(2, [fc]); # f(c)
   formulas(3, [Dfc, eval(_A1,x=xc)]); # f'(c)
   formulas(4, [fc−Dfc*(x−xc), _A2−Dfc*(x−xc), fc−_A3*(x−xc), _A2−_A3 *(x−xc)]); # y_tan
end:

The problem author provides correct-answers formulas for the jth answer _Aj using a statement of the form formulas(j, [Fj_1, Fj_2, . . . , Fj_Nj]), where the first formula Fj_1 depends only on the parameters and any additional formulas Fj_2, Fj_3, . . . generally depend on prior answers _Ai (see FIGS. 2 and 5). When procedure answers( ) is executed, it calls procedure formulas( ) with j=1, then 2, . . . , then Nj. If an answer for _Aj is submitted, then the procedure formulas( ) in the grading module sees if it agrees with all possible values generated by Fj_1, Fj_2, . . . , Fj_Nj and it then uses the Prior- and Later-Answer Strategies to update the correctness status of _A1, . . . , _Aj (see ???). Procedure answers( ) is executed with a different procedure formulas( ) when a problem is installed the on the Problem Table.

An instructor can set up a gradable activity so that the substituted parameter values are the same for all students (say, for a quiz or exam); individualized for each student, depending on a student ID stored on the database (say, for a homework); or assigned randomly (say, for a tutorial). For all three choices, limits must be imposed on both assigned parameter values and incorrect submitted intermediate answers to ensure reasonable answers and avoid run-time errors such as division by zero when correct or incorrect prior answers are substituted in a formula for a later one.

The imposition of such restrictions is the responsibility of the problem author, who does this by providing the set Parameter_Restrictions and lists Acceptability_Tests and Comparison_Choices, as described above. Parameter restrictions for Examples 1 and 2 are discussed hereinabove.

Acceptability tests are similar to parameter restrictions. For Example 1, the problem author might specify the following Acceptability_Tests list, in which [ ] indicates no restriction:

[_A1<0, [ ], _A3 >0, A4 >0, _₄5 >0 [ ]].

_A3 is a nonzero length and therefore must be positive. The _A4 test follows from the Example 1 restriction that yA and yB must be greater than 1, hence positive. The _A5 test demands that the answer have the form of a straight line. This is easily done in a CAS, e.g., by requiring that the Maple command degree(_A5,x) returns 1. Finally, _A4 and _A6 require no test because no _Aj formula depends on _A4 or _A6. (In fact, the last answer of any problem cannot be a prior answer, hence never requires an acceptability test.) For Example 2, the problem author might require that _A1 has the same form as the derivative of f(x), say, a weighted sum of sin(3×) and cos(2×), and that _A2 and _A3 be neither 0 nor 1. These conditions are also easily tested using a computer algebra system.

A reasonable Comparison_Choices list for Example 1 would specify exact, numerical equality for _A1 through _A5, and equivalent equations for A6. A reasonable list for Example 2 would specify equivalent expression for _A1 and _A4, and exact numerical equality for _A2 and _A3. For both problems, the nature of the correct answers, allowed only one natural comparison for each one. Had some answers been decimals, the problem author could have allowed the instructor to choose between decimal-place and significant-digit agreement between the submitted answer and "correct" values generated by formulas( ).

To ensure reliable grading, problems must be added to the database's Problem Table via an Authoring Tool that performs extensive tests on the author-provided data and, if ok, then sends it in the correct format to the Database Manager, who has the necessary utilities and privileges to add the problem to the Problem Table (see FIG. 1).

As part of the installation, either the Authoring Tool or the problem-adding-utility will execute procedure answers( ) using a procedure formulas( ) that augments the author-provided data with dependent-answer data that expedites the "bookkeeping" needed to implement the Prior- and Later-Answer Strategies and the CRO deter-mination for the Answer-Entry Window. One way to do this is to create and store two lists of lists, say Dependent_Answers and All_Prior_Answers, as follows:

When formula(j, [Fj__1, Fj__2, . . . , Fj_Nj ]) is executed, it stores the lists of all _Ais (if any) that appear in each of the formulas Fj__1, Fj__2, . . . , Fj_Nj as the jth entry of Dependent_Answers, and it stores the lists of all prior _Ais on which each formula Fj__1, Fj__2, . . . , Fj_Nj depends as the jth entry of All_Prior_Answers.

In Example 1, F2__2 (yB−yA)/_A1 and F3__2=√(_A1$^2$+ Dy$^2$) depend on _A1. Similarly, F4__2 and F4__3 depend on _A2; F6__2 and F6__3 depend on _A3; and F6__2 and F6__4 depend on _A5. Consequently, the 6-list list Dependent_Answers is

[[ ], [[ ],[_A1]], [[ ],[_A1]], [[ ],[_A2],[_A2]], [ ],
 [[ ],[_A5,_A3],[_A3],[_A5]]]

and the 6-list list All_Prior_Answers is

[[ ], [[ ],[_A1]], [[ ],[_A1]], [[ ],[_A2, _A1]],[_A2, _A1]],
 [ ],
 [[ ],[_A5,_A3,_A1]],[_A3,_A1]],[_A5,_A3,_A1]]]

Similarly, Example 2 has four answers, so Dependent_Answers is

[[ ], [ ], [[ ],[_A1]], [[ ],[_A2],[_A3],[_A3],[_A2]]]

and All_Prior_Answers is

[[ ], [ ], [[ ],[A1]], [[ ],[_A2],[_A3,_A2],[_A3,_A2]]].

The last entry of all these lists is a 4-entry list. For Example 1 these four entries correspond to the four _A6 formulas [F6__1, F6__2, F6__3, F6__4]; for Example 2 they correspond to the four _A4 formulas [F4__1, F4__2, F4__3, F4__4]. Storing the _Ai entries in reverse order improves the efficiency with which they expedite the Prior- and Later-Answer Strategies and C-R-O determination.

The Grading Module will use a different procedure formulas( ) to do the actual grading as prescribed by the problem author and instructor. The use of a single procedure name within answers( ) [here formulas( )] for different tasks, all transparent to the problem author, is seen as a non-obvious enhancement of existing computerized-grading art.

It is assumed that a mechanism exists for storing an ID for each student in each course on the Course Table. In assigning a problem for a course activity, the Instructor Interface will ask the instructor to choose a parameter selection method to indicate how values for a parameter-value list Parameter_Values are to be assigned. The choices are: Instructor_Specified (Parameter_Values stores these values, used by all students); Random (the stored Parameter_Values will be randomly generated for each student); ID_Individualized (Parameter_Values will store values determined by a student ID).

The parameter selection method is stored with the activity information on the course table. Provision must be made to ensure that regardless of how the Parameter_Values list assigned, the values satisfy the author-provided parameter restrictions. For the parameter values given for Examples 1 and 2 as illustrated in FIGS. 2 and 5, these lists are

[2, 1, −1, 3] and [x→x$^3$+½ x$^2$, x→x$^n$, x→x$^m$, 3, 2, 1, ½], respectively, with symbolic entries stored using appropriate CAS instructions.

To simplify the remaining discussion, let us assume that when several comparison choices for an Aj are available, the instructor will be asked to select one, hence that each submitted answer is tested for correctness in only one way and the selected comparison descriptors are stored in a list Selected_Comparisons on the Course Table.

If the parameter selection method for an activity is Random or ID_Individualized, then students will work problems with different Parameter_Values lists. If the list for a given student was not previously stored, the Student Client gets it from the CAS module and stores it on the Course Table. After grading, it also stores the list Status, whose jth entry, denoted as Status_j, stores the student's performance data for answer _Aj as follows:

Status_j=0 (_Aj not tried), −n (n failed tries), or +n
(correct on the n th try).

This important data will be used in the Answer-Entry Window and to generate reports for the student, instructor, and problem owner.

The Grading Module has three critical CAS components, herein referred to as prepare( ), getCRO( ), and grade( ). In describing them, it is assumed that the Student Client has performed the initial "handshaking" [viz., verify the student's ID for the course, then ask for a gradable activity (homework, tutorial, quiz/exam, etc.), a desired problem for the activity, and perhaps whether the student wishes to see the problem statement displayed], and has queried the system database to get the data that is needed to grade the problem as described above.

The Student Client first passes the parameter selection method, student ID, lists Parameter_Names, Parameter_Values, Parameter_Restrictions, All_Prior_Answers, and Status, and Problem_Text (or a blank string if the problem statement is not wanted) to procedure prepare( ), which does the following:

Step 1. If the Parameter_Values list doesn't contain values, they are assigned in accordance with the parameter selection method, subject to the conditions in Parameter_Restrictions.

Step 2. Call procedure getCRO( ), which uses lists Status and All_Prior_Answers to get the list CRO as described above.

Step 3. If passed Problem_Text rather than a blank string, call procedure Convert2HTML( ) to get HTML that displays the problem statement with Parameter_Values substituted for Parameter_Names.

Step 4. Return CRO, Parameter_Values, and HTML for the problem statement to the Student Client.

Note 1: CASs have the built-in ability to convert CAS statements to MathML (an HTML enhancement that displays mathematical expressions). This makes it easy to create a CAS procedure, say Convert2HTML( ), that parses Problem_Text, substitutes Parameter Values for Parameter Names, and then converts the result to HTML that displays |* *|-delimited CAS math expressions in standard math notation.

Note 2: For some course activities, the student can choose to submit a file of answers created off-line using a provided software tool. In this case, the call to prepare( ) will not be necessary.

Recall that the jth entry of the list CRO is C, R, or O according as _Aj is already correct, required for full credit (i.e., a final answer), or optional (i.e., an intermediate answer). The Student Client uses the lists CRO and Status to display the Answer-Entry Window (see FIG. 3). It then receives the set of submitted answers and forms a submitted-answer list SA, whose jth entry is either the submitted answer to _Aj or a not-answered designator, say na. For the submitted answers shown in FIG. 2, the submitted-answer list would be $$SA=[-2, -\tfrac{2}{3}, na, na, \tfrac{1}{3}, 4, (x-\tfrac{1}{2})^2+(y-4)^2=2],$$

with CAS syntax used to describe the mathematical operations (here, squaring). The Student Client then passes SA, along with the lists Status, Parameter_Names, Parameter_Vaues, Dependent_Answers, All_Prior_Answers, Selected_Comparisons, and procedure answers( ) to procedure grade( ), which grades the SA entries, updates Status to reflect the results, calls getCRO( ) with this revised Status list, and returns the updated Status and CRO. Finally, the Student Client uses these lists to report the results to the student (see FIG. 4).

As such, an invention has been disclosed in terms of preferred embodiments thereof, which fulfill each and every one of the objects of the invention as set forth hereinabove, and provide a new and useful process for computerized grading of formula-based multi-step problems via a web-interface of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. A method of automated grading of formula-based multi-step problems using a Computer Algebra System (CAS) based computer program, including the steps of:
   a) providing (1) a memory means for storing said problems along with one or more formulas for solving steps of said problems, and (2) data to enable and facilitate assessment of correctness of said steps of said problems, said steps of said problems including a first or prior step and at least one subsequent or later step;
   b) storing at least one multi-step problem in said memory means along with one or more formulas for obtaining one or more later-step answers from prior-step answers that have been obtained for said problem;
   c) providing said CAS based computer program that can grade sets of simultaneously submitted answers to any or all steps of said at least one multi-step problem;
   d) providing a user interface with selective access to said memory means and said computer program;
   e) providing a global computer network with which said user interface can be connected to said memory means and said grading program;
   f) wherein a correct answer to one or more steps of said at least one multi-step problem can be obtained by any of one or more of said stored formulas, possibly involving different prior-step answers and possibly resulting in different values for which at least partial credit can be given; and
   g) providing an authoring tool to test data provided to enable correctness assessment for a problem for a correctness and robustness under actual or simulated grading conditions before said enabling data is stored.

* * * * *